US010303132B2

(12) United States Patent
Murai et al.

(10) Patent No.: US 10,303,132 B2
(45) Date of Patent: May 28, 2019

(54) CONTROL DEVICE, CONTROL METHOD, AND CONTROL PROGRAM

(71) Applicant: OMRON Corporation, Kyoto (JP)

(72) Inventors: Masahiro Murai, Kasatsu (JP); Yukio Iname, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/818,757

(22) Filed: Nov. 21, 2017

(65) Prior Publication Data
US 2018/0224810 A1  Aug. 9, 2018

(30) Foreign Application Priority Data

Feb. 8, 2017 (JP) .................. 2017-021253

(51) Int. Cl.
| | | |
|---|---|---|
| G05B 13/00 | (2006.01) | |
| G05B 13/04 | (2006.01) | |
| G05B 19/406 | (2006.01) | |
| G05B 19/416 | (2006.01) | |
| H02K 11/24 | (2016.01) | |
| G05D 17/02 | (2006.01) | |
| G05D 13/62 | (2006.01) | |
| H02K 11/21 | (2016.01) | |
| G05B 19/19 | (2006.01) | |

(52) U.S. Cl.
CPC .......... *G05B 13/044* (2013.01); *G05B 19/19* (2013.01); *G05B 19/406* (2013.01); *G05B 19/416* (2013.01); *G05D 13/62* (2013.01); *G05D 17/02* (2013.01); *H02K 11/21* (2016.01); *H02K 11/24* (2016.01); *G05B 2219/33119* (2013.01); *G05B 2219/34013* (2013.01); *G05B 2219/36176* (2013.01); *G05B 2219/41248* (2013.01)

(58) Field of Classification Search
CPC .............................. G05B 13/044; H02K 11/21
USPC ........................................................ 318/561
See application file for complete search history.

(56) References Cited

U.S. PATENT DOCUMENTS

| | | |
|---|---|---|
| 5,475,291 A | 12/1995 | Yoshida et al. |
| 5,656,906 A | 8/1997 | Iwashita et al. |
| 2015/0084572 A1 | 3/2015 | Tanaka |

FOREIGN PATENT DOCUMENTS

JP    2009-122778    6/2009

OTHER PUBLICATIONS

"Search Report of European Counterpart Application," dated Jul. 6, 2018, p. 1-p. 9.

*Primary Examiner* — Erick D Glass
(74) *Attorney, Agent, or Firm* — JCIPRNET (57) ABSTRACT

A control parameter which causes a servo motor to perform an operation with higher accuracy depending on a purpose and a situation is determined. A control device (10) includes a data evaluation unit (131), a parameter determination unit (132), and an operation data acquisition unit (133). The operation data acquisition unit (133) acquires operation data including a speed or a torque of a servo motor (900). The data evaluation unit (131) calculates an evaluation value by using normative data corresponding to a target of the operation data and the operation data. The parameter determination unit (132) determines a control parameter applied to a servo driver (90) which controls operations of the servo motor (900) by using the evaluation value.

17 Claims, 10 Drawing Sheets

| CONTROL PARAMETER NAME |
| POSITION LOOP GAIN |
| SPEED LOOP GAIN |
| SPEED LOOP INTEGRAL TIME CONSTANT |

CONTROL DEVICE, CONTROL METHOD, AND CONTROL PROGRAM

CROSS-REFERENCE TO RELATED APPLICATION

This application claims the priority benefit of Japanese Patent Application no. 2017-021253, filed on Feb. 8, 2017. The entirety of the above-mentioned patent application is hereby incorporated by reference herein and made a part of this specification.

BACKGROUND

Technical Field

The present disclosure relates to a control device, a control method, and a control program for setting control parameters of a servo driver.

Description of Related Art

Various methods for adjusting control parameters of a servo driver which drives a servo motor have been devised. For example, Patent Literature 1 discloses a control parameter adjustment device of a positioning control apparatus.

This control parameter adjustment device transmits a control parameter to a servo driver and acquires actual position data from the servo driver. The control parameter adjustment device extracts a settling feature quantity from normative position data and actual position data, and evaluates the settling feature quantity using an allowable value. The control parameter adjustment device adjusts a control parameter by using the evaluation result.

[Patent Document 1] Japanese Patent Application Publication (JP-A) No. 2009-122778

However, in a method of adjusting control parameters depending on only position data, operations until reaching a target position cannot be controlled. Accordingly, it is impossible to cause a servo motor to perform an operation with higher accuracy depending on a purpose or a situation.

Therefore, the present disclosure provides a technology for setting a control parameter which causes a servo motor to perform an operation with higher accuracy depending on a purpose and a situation.

SUMMARY

A control device of the present disclosure includes an operation data acquisition unit, a data evaluation unit, and a parameter determination unit. The operation data acquisition unit acquires operation data including a speed or a torque of a servo motor. The data evaluation unit calculates an evaluation value by using normative data corresponding to a target of operation data and the operation data. The parameter determination unit determines a control parameter applied to a servo driver which controls the operation of the servo motor by using the evaluation value.

In this configuration, a control parameter is determined by using the speed or torque of the servo motor.

In the control device of the present disclosure, the parameter determination unit changes the control parameter when the evaluation value is out of a range of an allowable value, and maintains the control parameter when the evaluation value is within the range of the allowable value.

In this configuration, whether an adjusted control parameter is appropriate and whether the control parameter needs to be changed are correctly determined by providing an allowable value of an evaluation value corresponding to an appropriate control parameter.

According to the present disclosure, it is possible to correctly set a control parameter which causes a servo motor to perform an operation with higher accuracy depending on a purpose and a situation.

DESCRIPTION OF THE EMBODIMENTS

Figure 1:
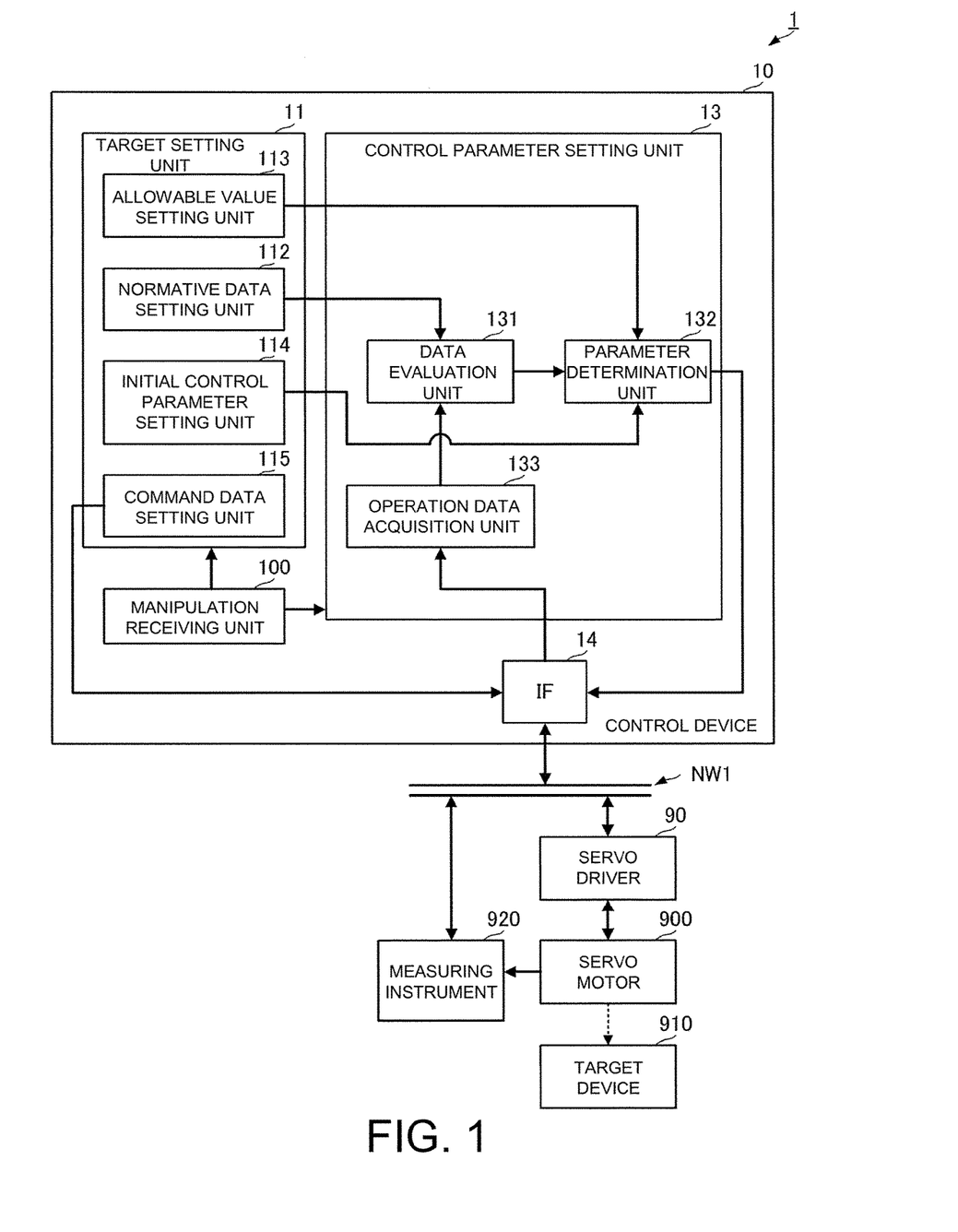
FIG. 1 is a block diagram illustrating a major configuration of a control device and a control system according to a first embodiment of the present disclosure.
Figure 2:
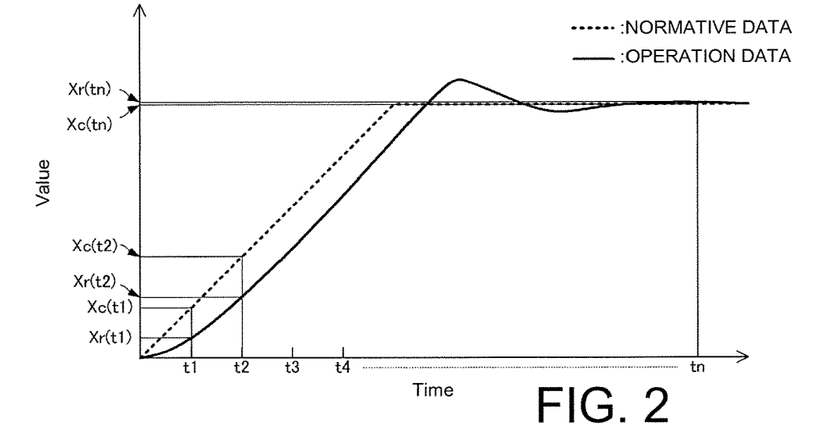
FIG. 2 is a table showing an example of control parameters.
Figure 3:
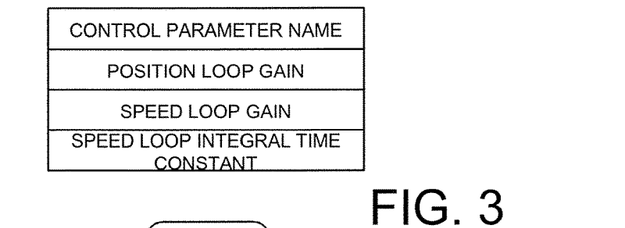
FIG. 3 is a diagram illustrating the concept of an evaluation value.

A control device, a control method and a control program according to a first embodiment of the present disclosure will be described with reference to the drawings. FIG. 1 is a block diagram illustrating a major configuration of a control device and a control system according to the first embodiment of the present disclosure. FIG. 2 is a diagram illustrating the concept of an evaluation value. FIG. 3 is a table showing an example of control parameters which are update targets.

As illustrated in FIG. 1, a control system 1 includes a control device 10, a servo driver 90, a servo motor 900, a target device 910, and a measuring instrument 920. The control device 10 includes a target setting unit 11, a control parameter setting unit 13, an interface (IF) unit 14, and a manipulation receiving unit 100. The control parameter setting unit 13 includes a data evaluation unit 131, a parameter determination unit 132, and an operation data acquisition unit 133.

The target setting unit 11 and the control parameter setting unit 13 are configured as information processing devices such as a CPU, an MPU, or the like, and programs executed by the information processing devices.

The interface unit 14 of the control device 10 is connected to the servo driver 90 through a network NW1. The servo driver 90 is a device to which a control parameter set by the control device 10 is applied. The servo driver 90 is connected to the servo motor 900 to be controlled, and the servo motor 900 is attached to the target device 910. In addition, the interface unit 14 of the control device 10 is connected to the measuring instrument 920 through the network NW1. The measuring instrument 920 uses the servo motor 900 as a measurement target. Further, the measuring instrument 920 may use the target device 910 as a direct measurement target.

The servo driver 90 controls the servo motor 900 according to a control parameter applied by the control device 10 and command data serving as a basis of operation data. A predetermined tact in the target device 910 is executed according to the operation of the servo motor 900.

The measuring instrument 920 measures the speed or the torque of the servo motor 900, and generates speed data or torque data. In addition, the measuring instrument 920 may measure the position of the servo motor 900, and generate position data. Further, the measuring instrument 920 may directly measure a predetermined speed, vibration and position of the target device 910, and generate speed data, vibration data and position data.

The manipulation receiving unit 100 is configured as a keyboard, a mouse, a touch panel, or the like, and receives a manipulation from an operator. For example, the manipulation receiving unit 100 receives a control parameter setting manipulation from the operator. The manipulation receiving unit 100 instructs the target setting unit 11 and the control parameter setting unit 13 to execute a control parameter optimization process on the basis of reception of the manipulation. Meanwhile, the manipulation receiving unit 100 may be provided outside the control device 10 instead of being included in the control device 10.

The target setting unit 11 includes a normative data setting unit 112, an allowable value setting unit 113, an initial control parameter setting unit 114, and a command data setting unit 115. The normative data setting unit 112 sets normative data corresponding to a norm of an operation of the servo motor 900 according to a manipulation input of the operator. The normative data is a numerical value indicating an operation of the servo motor 900, like operation data which will be described below, and represents a speed, a torque, a position and the like.

Further, the normative data is stored in advance for each type of the servo motor 900, and the target setting unit 11 may read the stored normative data when the manipulation receiving unit 100 selects a model of the servo motor 900. In addition, the target setting unit 11 may set the normative data in response to manual input of the operator through the manipulation receiving unit 100. For example, the normative data is data represented by a dotted line of FIG. 2. The normative data setting unit 112 outputs the normative data to the data evaluation unit 131.

The allowable value setting unit 113 sets an allowable value of an evaluation value used during parameter determination, which will be described below, in response to a manipulation input of the operator. The allowable value is appropriately set depending on the operation accuracy, response speed and the like of the servo motor 900. The allowable value setting unit 113 outputs the allowable value to the parameter determination unit 132.

The initial control parameter setting unit 114 sets an initial value of the parameter determination unit 132. Here, the initial control parameter setting unit 114 sets all parameters to be set to the servo motor 900.

The command data setting unit 115 sets command data and outputs the command data to the servo driver 90 through the interface unit 14. Further, the command data setting unit 115 may output the command data to the data evaluation unit 131.

The operation data acquisition unit 133 acquires speed data or torque data as operation data from the measuring instrument 920 through the interface unit 14 and the network NW1. Here, the operation data acquisition unit 133 may acquire position data in addition to the speed data or the torque data as the operation data. Further, the operation data acquisition unit 133 may acquire vibration data as the operation data. The operation data acquisition unit 133 outputs the operation data to the data evaluation unit 131. For example, the operation data is data indicating a solid line of FIG. 2. The operation data acquisition unit 133 outputs the operation data to the data evaluation unit 131.

The data evaluation unit 131 calculates an evaluation value by using the operation data and the normative data. Specifically, as shown in FIG. 2, the data evaluation unit 131 performs discrete sampling on the operation data and the normative data on the time axis, and acquires operation data $Xr(tn)$ and normative data $Xc(tn)$ at each time tm (m=1 to n). The data evaluation unit 131 calculates a difference value (difference value on the basis of the normative data $Xc(tn)$) between the operation data $Xr(tn)$ and the normative data $Xc(tn)$ at each time tm. The data evaluation unit 131 calculates a norm from the difference value and regards the norm as an evaluation value. The data evaluation unit 131 outputs the evaluation value to the parameter determination unit 132.

As a norm, L1 norm, L2 norm, L∞ norm (a maximum difference between the operation data and the normative data) or the like can be employed. L1 norm is the sum of the differences between the operation data and the normative data, L2 norm is a sum of the squares of the differences between the operation data and the normative data, and L∞ norm is a maximum difference between the operation data and the normative data. Such norms may be appropriately selected depending on purposes. When the L1 norm is used, a settling time can be reduced. When the L∞ norm is used, an overshoot amount can be decreased. When the L2 norm is used, the settling time and the overshoot amount can be appropriately adjusted.

Here, according to a determination interval of a control parameter, the data evaluation unit 131 calculates a norm by using operation data and normative data included within a time of the determination interval, and regards the norm as an evaluation value.

The parameter determination unit 132 compares the evaluation value with the allowable value to determine a control parameter suitable for the servo driver 90. Here, initial parameters of the parameter determination unit 132 are set by the initial control parameter setting unit 114, as described above. In addition, control parameters to be determined are parameters related to a position and a speed, such as a position loop gain, a speed loop gain and a speed loop integral time constant, illustrated in FIG. 3. Meanwhile, control parameters to be determined may include at least a speed related control parameter in the case of speed control, and may include at least a torque related control parameter in the case of torque control. Further, a control parameter of the servo driver 90 can be set more appropriately by adding a position related control parameter.

In such a configuration, determination of the control parameter is repeated as follows.

The data evaluation unit 131 calculates a norm by using operation data within a predetermined time after the parameter determination unit 132 outputs a previous control parameter and normative data corresponding to the operation data, and outputs the norm to the parameter determination unit 132 as an evaluation value.

The parameter determination unit 132 determines a current control parameter using the evaluation value, and outputs the current control parameter to the servo driver 90. The servo driver 90 performs operation on the servo motor 900 by using the current control parameter. The measuring instrument 920 measures this operation to generate operation data. The operation data acquisition unit 133 acquires the operation data.

The data evaluation unit 131 calculates a norm using the current operation data and normative data corresponding to the current operation data, and outputs the norm to the parameter determination unit 132 as an evaluation value. The parameter determination unit 132 determines a next control parameter by using the evaluation value, and outputs the next control parameter to the servo driver 90. This process is repeated hereafter.

In this process, the parameter determination unit 132 maintains the currently set control parameter when the evaluation value is less than an allowable value. On the other hand, the parameter determination unit 132 changes the control parameter by using a known optimization algorithm when the evaluation value is equal to or greater than the allowable value.

By using this configuration and process, it is possible to correctly set a control parameter which cannot be set using only position data and causes a servo motor to perform an operation with higher accuracy depending on a purpose and a situation.

Specifically, this configuration is effective for the operation of a servo motor in which low power, low torque or high torque following capability is important. For example, in the case of low-power consumption, power consumption can be minimized. In the case of low-torque objective, it is possible to further increase the speed more to improve tact time. Further, in the cape of low-torque objective, a small rated servo motor can be introduced, and thus the cost of a servo system can be reduced. In the case of high-torque followability objective, quality enhancement of a product formed by a target device can be realized.

Figure 4:
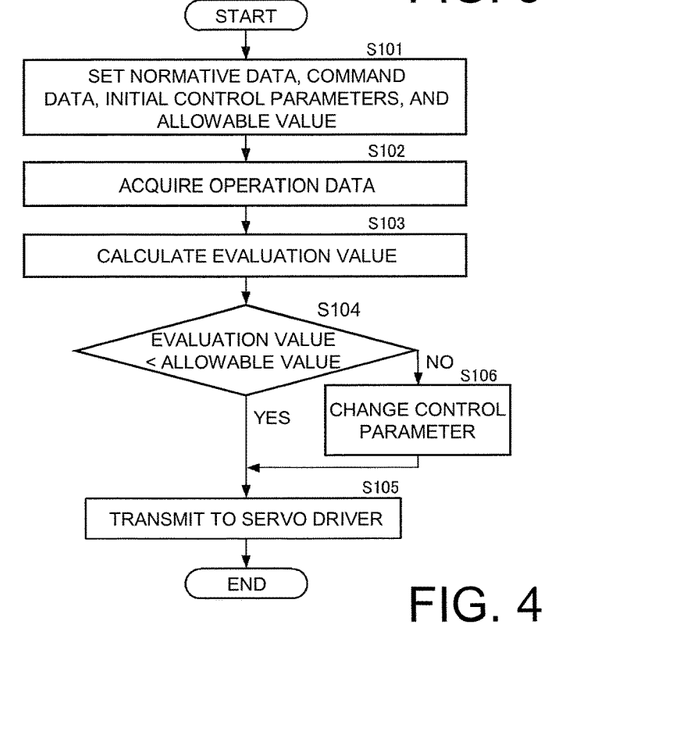
FIG. 4 is a flowchart illustrating a control method according to the first embodiment of the present disclosure.
Figure 5:
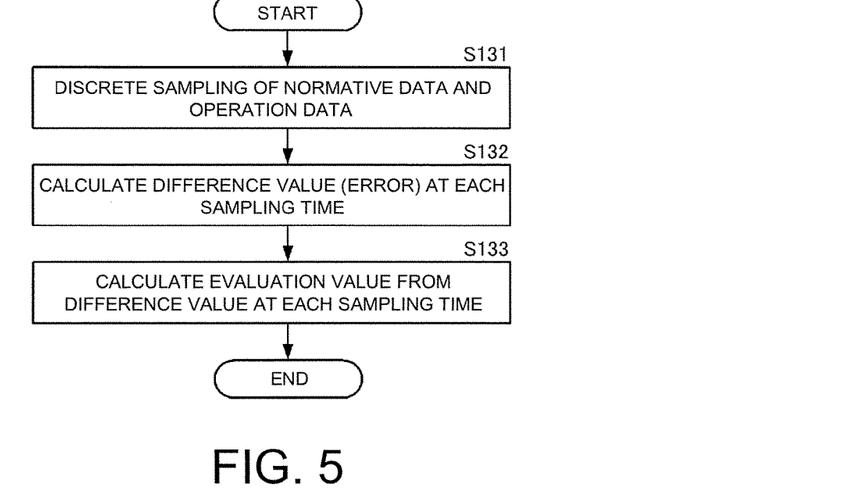
FIG. 5 is a flowchart illustrating a method of calculating an evaluation value.

A control parameter is set through a plurality of functional units has been illustrated in the above description, but processes illustrated in FIGS. 4 and 5 may be performed through an information processing device and a program as described above. Meanwhile, a detailed process of following each step has been described above in detail, and thus detailed description thereof will be omitted. FIG. 4 is a flowchart illustrating a control method according to the first embodiment of the present disclosure. Further, FIG. 4 illustrates one-time control parameter determination and transmission, and processes after step S102 of FIG. 4 are sequentially repeated. FIG. 5 is a flowchart illustrating a method of calculating an evaluation value.

An information processing device sets normative data, command data, initial control parameters, and an allowable value (S101). The information processing device acquires operation data of the servo motor 900 from the measuring instrument 920 (S102). Meanwhile, the operation data may be acquired from the servo driver 90.

The information processing device calculates an evaluation value by using the normative data and the operation data (S103). More specifically, the information processing device performs discrete sampling on the normative data and the operation data (S131). The information processing device calculates a difference value between the operation data and the normative data on the basis of the normative data at each sampling time (S132). The information processing device calculates a norm as an evaluation value from the difference value at each sampling time (S133).

When the evaluation value is equal to or greater than the allowable value (out of an allowable range according to the allowable value) (NO in S104), the information processing device changes the control parameter (S106) and outputs the control parameter to the servo driver 90. When the evaluation value is less than the allowable value (YES in S104), the information processing device transmits the current control parameter to the servo driver 90 without changing the control parameter (S105). Further, when the control parameter is not changed, the control parameter may not be output to the servo driver 90.

Figure 6:
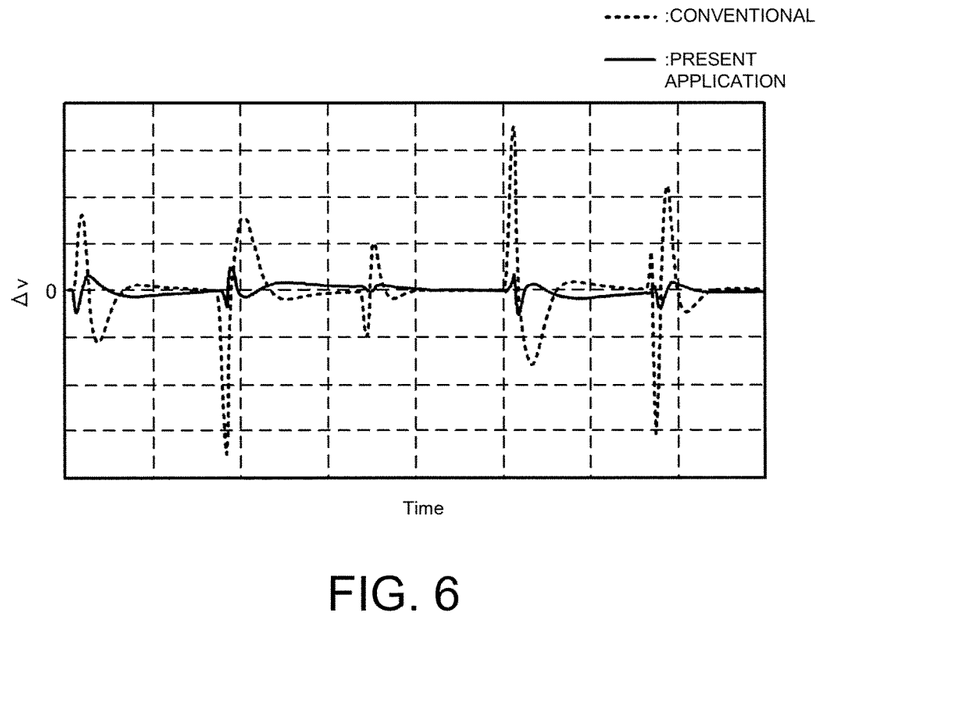
FIG. 6 is a graph showing a difference between operation data and normative data in an embodiment of the present disclosure and an embodiment of a conventional art.

FIG. 6 is a graph showing a difference between operation data and normative data in an embodiment of the present disclosure and an embodiment of a conventional art. It is desirable that the difference be small. In FIG. 6, a solid line represents a case in which the embodiment of the present disclosure is employed and a dotted line represents a case in which the embodiment of the conventional art is employed. In FIG. 6, the horizontal axis represents time, and the vertical axis represents a speed difference Δv. Further, similar results are obtained with respect to a torque and thus description of the torque is omitted.

As shown in FIG. 6, a locally generated difference is decreased by using the embodiment of the present disclosure. That is, control closer to normative data can be realized. Meanwhile, a portion where a difference is locally generated is a portion where the speed abruptly changes, and even in such the portion, more accurate follow-up control for the normative data can be realized by using the embodiment of the present disclosure. That is, it is possible to realize more suitable control depending on the servo driver 90, the servo motor 900 and the target device 910.

Although a method of calculating an evaluation value for one control parameter has been illustrated in the above description, evaluation values for a plurality of control parameters can be calculated through the following methods.

(1) A plurality of evaluation values are weighted and added.

(2) One evaluation value is restricted and other evaluation values are minimized (within an allowable value).

More appropriate control parameters can be set in the case of (1) and a settling time can be reduced in the case of (2). For example, if speed accuracy is important in the case of (2), it is possible to reduce a settling time while increasing speed accuracy by varying weighting of a speed evaluation value and fixing weighting of other evaluation values.

Figure 7:
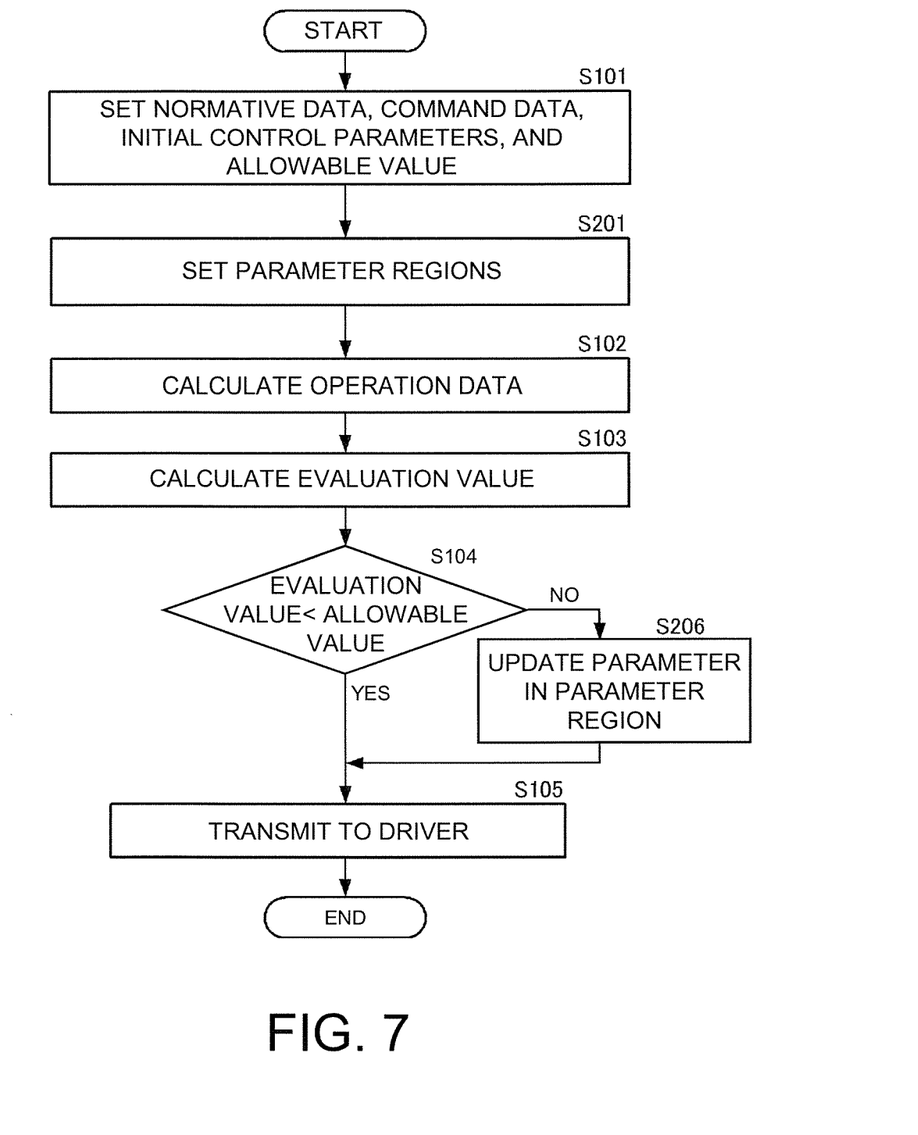
FIG. 7 is a flowchart illustrating another control method according to the first embodiment of the present disclosure.
Figure 8A:
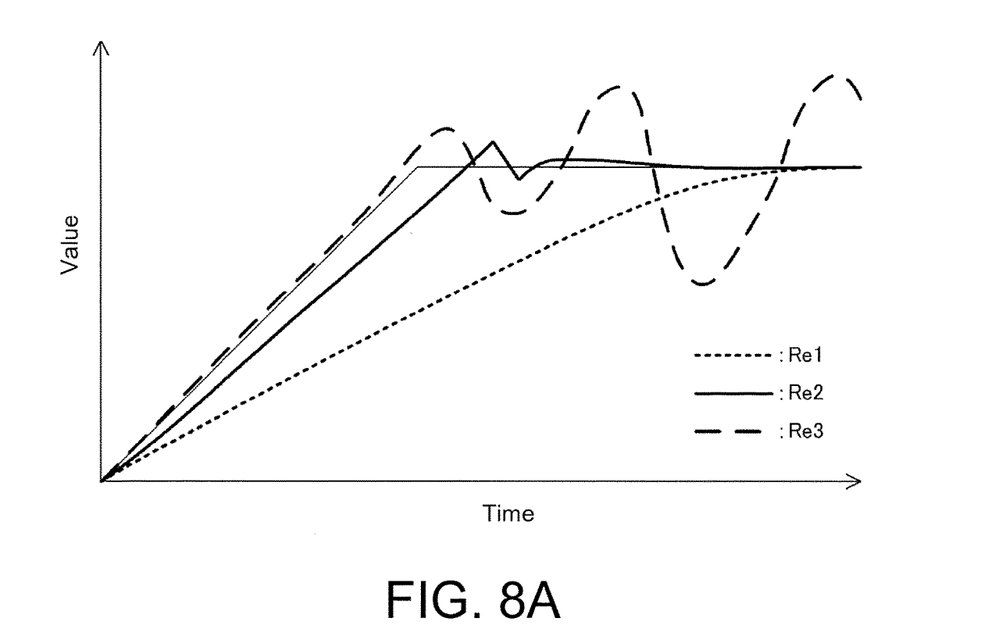
FIG. 8A illustrates waveforms of operation data when each parameter region is used.
Figure 8B:
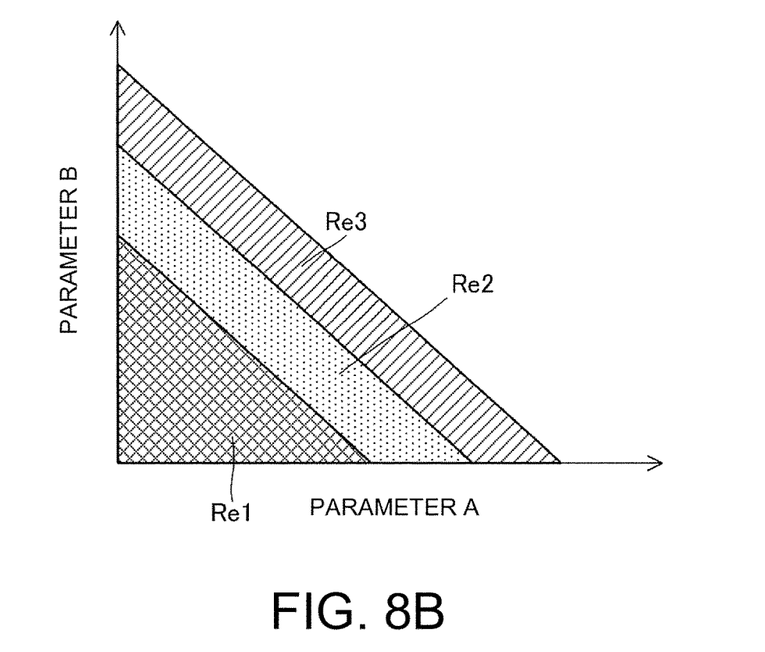
FIG. 8B illustrates a relationship between parameter regions.

In addition, the following process may be performed for the above-described control device, control method, and control program. FIG. 7 is a flowchart illustrating another control method according to the first embodiment of the present disclosure. FIG. 8A and FIG. 8B is a diagram for describing restriction of a parameter setting region, FIG. 8A shows waveforms of operation data when each parameter region is used, and FIG. 8B is a diagram illustrating a relationship between parameter regions. Although FIG. 8A and FIG. 8B illustrate a case of two types of control parameters (parameter A and parameter B), the same concept can also be applied when one or three or more types of control parameters are provided.

In this control device, control method and control program, the settable region of the control parameter is specified. Other processes are the same as in the control device, control method and control parameter according to the first embodiment, and thus description of the same parts is omitted.

As illustrated in FIG. 7, the control device (information processing device) sets a parameter region (S201). The parameter region specifies a range of values that can be set in the control parameter in a control parameter optimization algorithm. In addition, the control device (information processing device) changes a control parameter within an available control parameter range set by the parameter region (S206) when an evaluation value is equal to or greater than an allowable value (NO in S104).

Specifically, parameter regions Re1, Re2 and Re3 are set as shown in FIG. 8A and FIG. 8B. The parameter region Re1 corresponds to a case of using a control parameter in which the waveform of operation data gradually rises and thus initial performance of following normative data is low, and the operation data coincides with the normative data over time. The parameter region Re2 corresponds to a case of using a control parameter in which rising of the waveform of operation data is slower than normative data but there is a certain degree of capability of following the normative data, and the operation data coincides with the normative data after slight overshoot. The parameter region Re3 corresponds to a case of using a control parameter in which vibration is repeated although the performance of operation data to follow normative data in an initial stage is high.

In this case, for example, the parameter region Re3 is not used. The parameter region Re1 is used during execution of the optimization algorithm but is not used for a finally determined control parameter. The parameter region Re2 is used during execution of the optimization algorithm and for a finally determined control parameter.

It is possible to correctly set a suitable control parameter by restricting control parameters in this manner.

Figure 9:
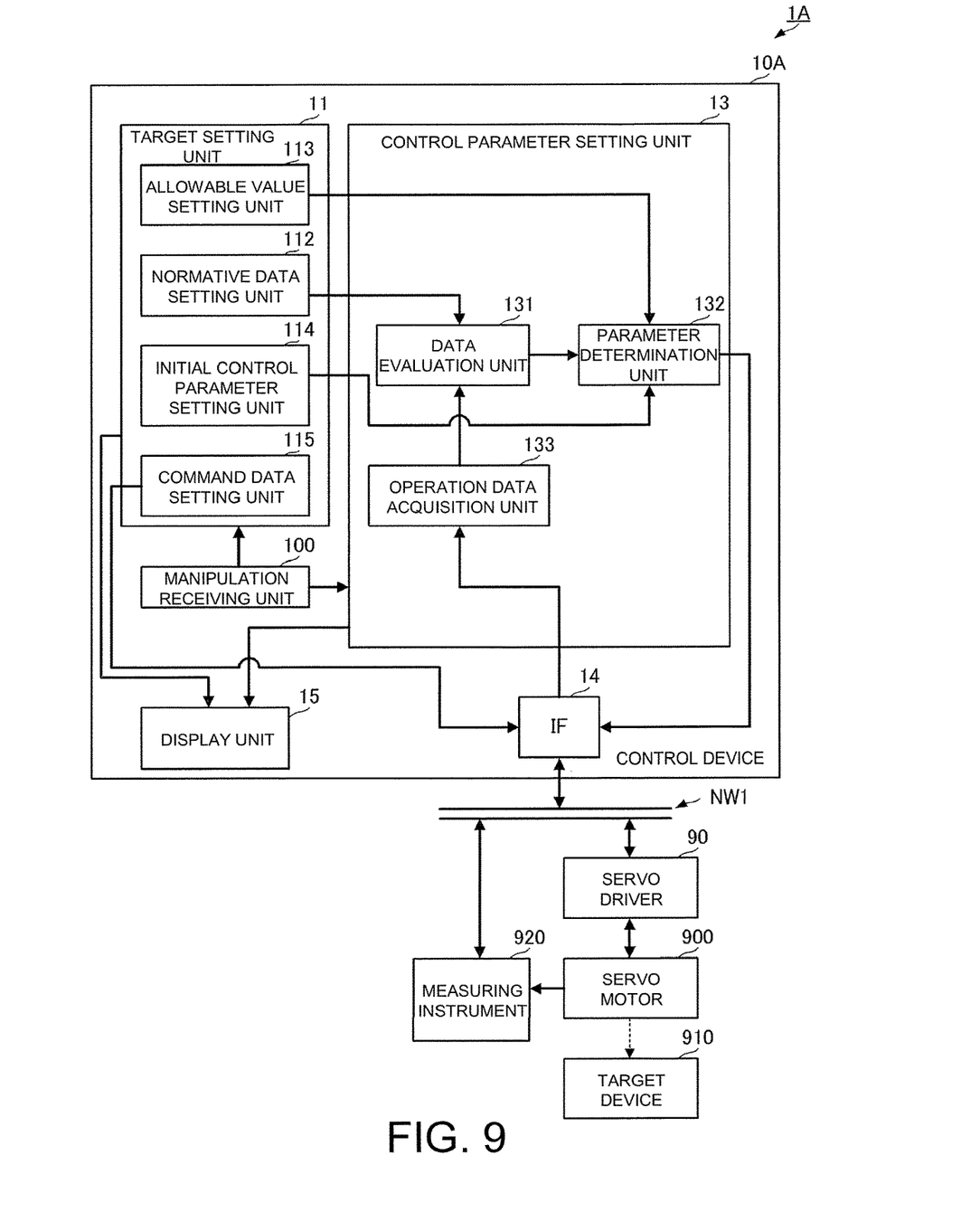
FIG. 9 is a block diagram illustrating a major configuration of a control device and a control system according to a second embodiment of the present disclosure.

Next, a control device, a control method, and a control program according to a second embodiment of the present disclosure will be described with reference to the drawings. FIG. 9 is a block diagram illustrating a major configuration of a control device and a control system according to the second embodiment of the present disclosure.

As illustrated in FIG. 9, a control device 10A of a control system 1A according to the second embodiment differs from the control device 10 according to the first embodiment in that the former includes a display unit 15. Other basic components of the control device 10A are the same as those of the control device 10 and thus description of the same parts is omitted.

The display unit 15 displays data (an evaluation image) related to control parameter setting performed in the control device 10A. For example, the display unit 15 displays waveforms of the aforementioned operation data and normative data, as illustrated in FIG. 2. Accordingly, the operator can easily check how the servo motor 900 operates according to the set control parameter on the basis of the normative data. In addition, the display unit 15 displays the above-described parameter regions and thus a position at which a control parameter is set according to execution of the optimization algorithm for each region can be easily recognized. Meanwhile, the display unit 15 may be provided outside of the control device 10A instead of being included in the control device 10A.

Figure 10A:
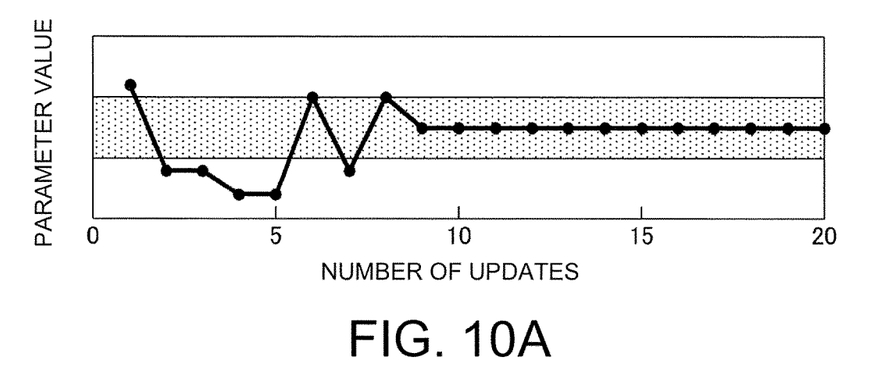
FIG. 10A is a diagram illustrating a relationship between a control parameter value and a settable range.
Figure 10B:
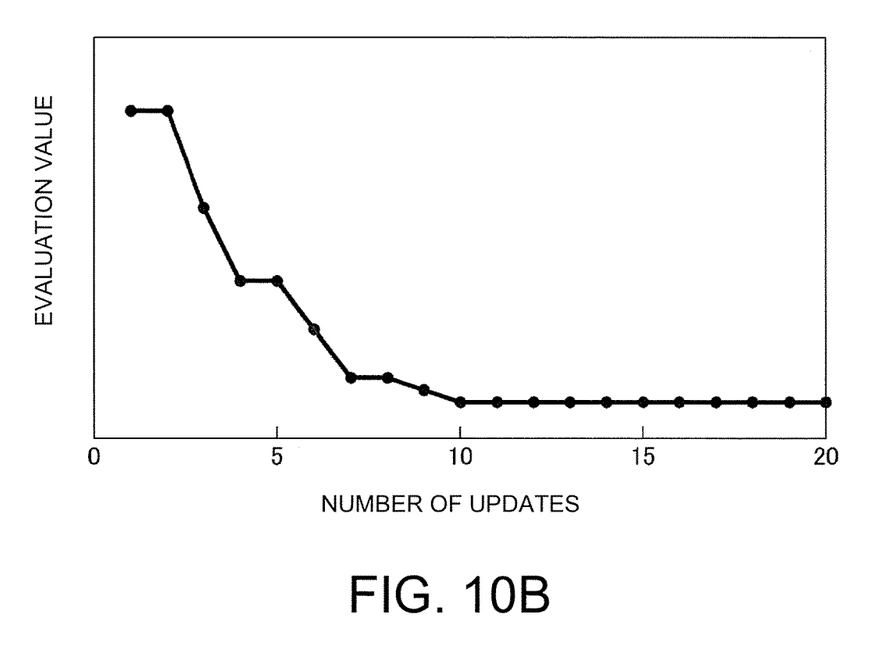
FIG. 10B is a diagram illustrating a variation in an evaluation value depending on the number of updates.

FIG. 10A and FIG. 10B is a diagram illustrating examples of a display screen in the control device according to the second embodiment. FIG. 10A is a diagram illustrating a relationship between a control parameter value and a settable range, in which the horizontal axis represents the number of updates (the number of times the setting of the control parameter is changed by using the optimization algorithm) and the vertical axis represents the control parameter value. FIG. 10B is a diagram illustrating a variation in an evaluation value depending on the number of updates, in which the horizontal axis represents the number of updates and the vertical axis represents the evaluation value. In the case of FIG. 10A, the operator can easily check whether the control parameter is in a predetermined parameter region. In the case of FIG. 10B, the operator can easily recognize that the evaluation value has converged on a small value.

Accordingly, the operator can easily recognize whether the control parameter has been optimally set.

Figure 11:
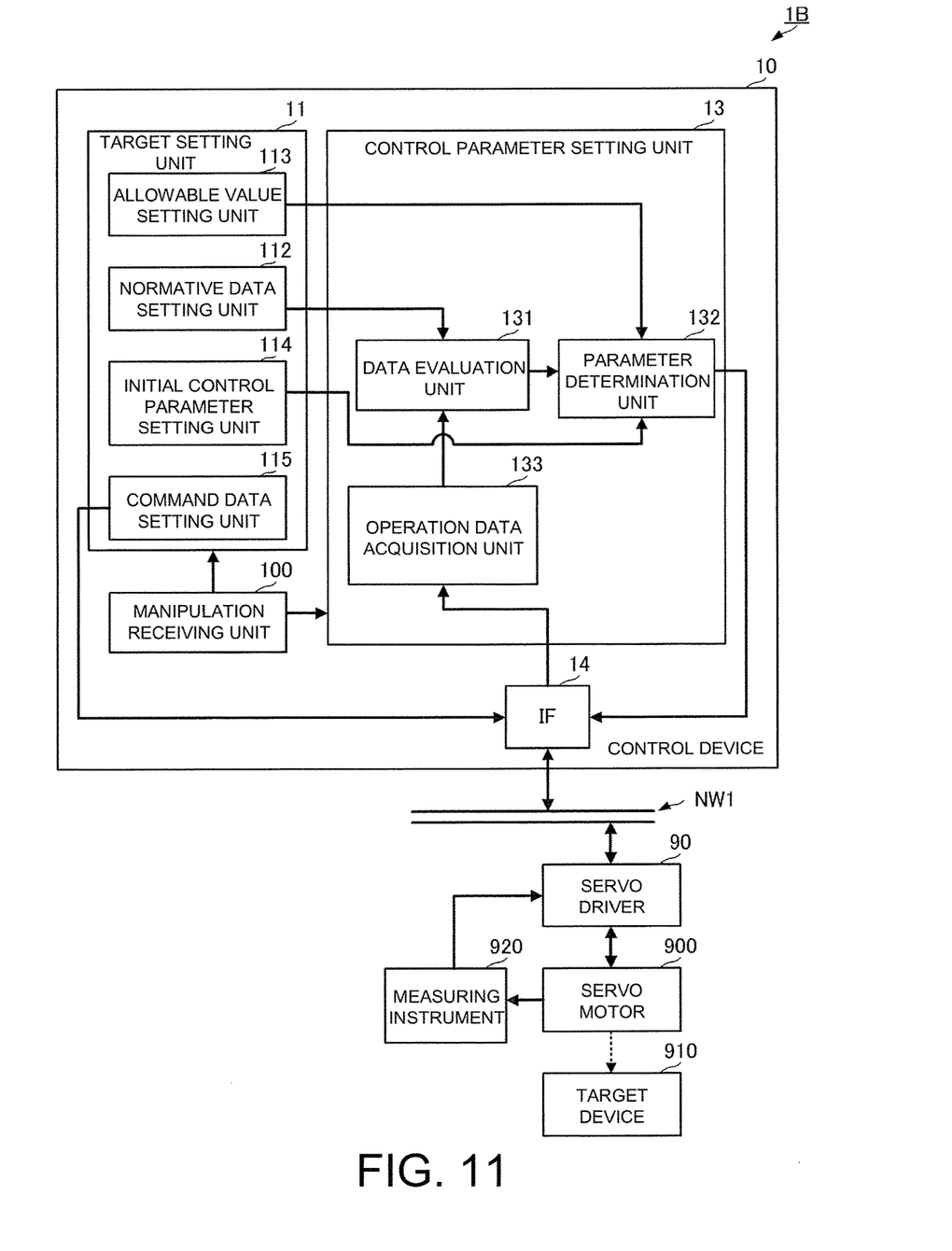
FIG. 11 is a block diagram illustrating a major configuration of a control device and a control system according to a third embodiment of the present disclosure.

Next, a control device, a control method, and a control program according to a third embodiment of the present disclosure will be described with reference to the drawings. FIG. 11 is a block diagram illustrating a major configuration of a control device and a control system according to the third embodiment of the present disclosure.

As illustrated in FIG. 11, a control system 1B according to the third embodiment differs from the control system 1 according to the first embodiment in that the measuring instrument 920 is connected to the servo driver 90. Other components of the control system 1B are the same as those of the control system 1 and thus description of the same parts is omitted.

The measuring instrument 920 detects the position, speed, torque or the like of the servo motor 900, and generates operation data (position data, speed data, torque data or the like). The measuring instrument 920 outputs the operation data to the servo driver 90.

The servo driver 90 outputs the operation data from the measuring instrument 920 to the control device 10. Alternatively, the servo driver 90 generates operation data with a different type based on the operation data from the measuring instrument 920, and outputs the operation data generated by the servo driver 90 to the control device 10. For example, when the servo driver 90 receives position data from the measuring instrument 920, the servo driver 90 calculates speed data from a temporal change of the position data, so as to generate the operation data including the speed data. The servo driver 90 outputs the operation data generated therein to the control device 10. Here, the servo driver 90 may output, to the control device 10, the operation data generated therein and the operation data generated by the measuring instrument 920 as a set.

In this configuration, the same operation and effects as those of the first embodiment can also be acquired.

Figure 12:
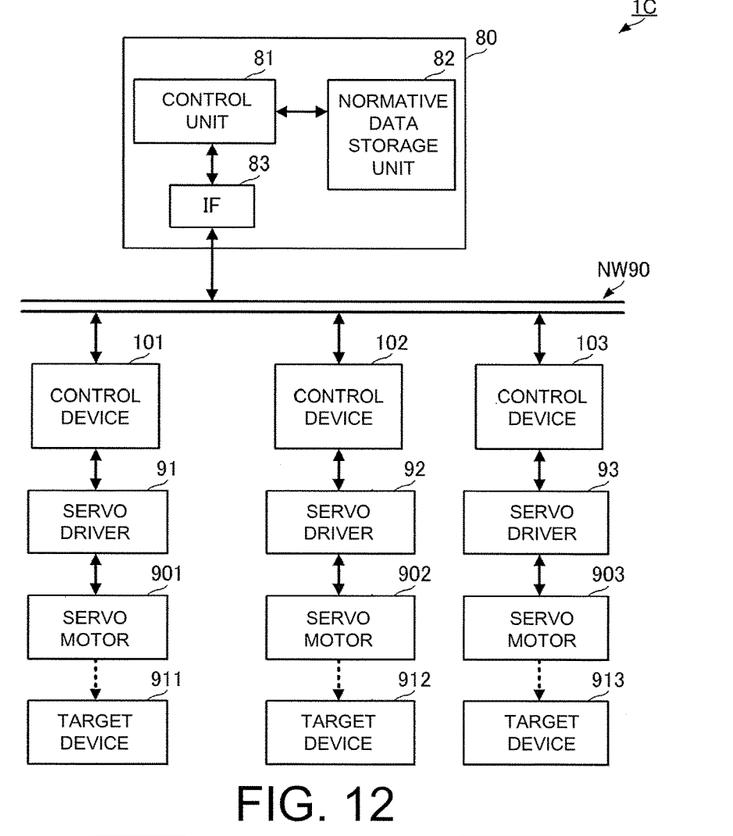
FIG. 12 is a block diagram illustrating a configuration of a control system according to a fourth embodiment of the present disclosure.

Next, a control system according to a fourth embodiment of the present disclosure will be described with reference to the drawings. FIG. 12 is a block diagram illustrating the control system according to the fourth embodiment of the present disclosure. Meanwhile, although a case in which there are three control devices, three servo drivers, three servo motors and three target devices will be described hereinafter, the configuration of the present embodiment can also be applied when there are two control devices, two servo drivers, two servo motors and two target devices and when there are four or more control devices, four or more servo drivers, four or more servo motors and four or more target devices.

As illustrated in FIG. 12, a control system 1C includes a server 80, control devices 101, 102 and 103, servo drivers 91, 92 and 93, servo motors 901, 902 and 903, and target devices 911, 912 and 913.

The control devices 101, 102 and 103 are the same as the aforementioned control devices 10 and 10A, and the servo drivers 91, 92 and 93 are the same as the aforementioned servo driver 90. The servo motors 901, 902 and 903 are the same as the aforementioned servo motor 900, and the target devices 911, 912 and 913 are the same as the aforementioned target device 910. The control device 101 is connected to the servo driver 91, the servo driver 91 is connected to the servo motor 901, and the servo motor 901 is connected to the target device 911. The control device 102 is connected to the servo driver 92, the servo driver 92 is connected to the servo motor 902, and the servo motor 902 is connected to the target device 912. The control device 103 is connected to the servo driver 93, the servo driver 93 is connected to the servo motor 903, and the servo motor 903 is connected to the target device 913.

The server 80 includes a control unit 81, a normative data storage unit 82 and an interface (IF) unit 83. The server 80 is connected to a network NW90 through the interface unit 83, and connected to the control devices 101, 102 and 103 through the network NW90.

The control unit 81 executes each process which will be described below. The normative data storage unit 82 stores normative data.

Figure 13A:
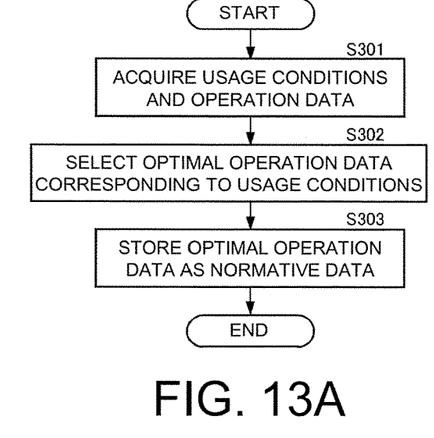
FIG. 13A is a flowchart illustrating a normative data storing process in a server.

(Selection and storage of normative data according to usage conditions) FIG. 13A is a flowchart illustrating a process of storing normative data in the server.

As illustrated in FIG. 13A, the control unit 81 of the server 80 acquires usage conditions and operation data from the control devices 101, 102 and 103 (S301). The usage conditions include a temperature and the like when a servo driver, a servo motor and a target device are used. The control unit 81 selects optimal operation data corresponding to the usage conditions from multiple pieces of acquired operation data (S302). The control unit 81 stores the optimal operation data into the normative data storage unit 82 as normative data (S303). Here, the control unit 81 correlates the normative data with the usage conditions and stores the normative data.

By performing this process, it is possible to select normative data corresponding to the usage conditions and store the selected normative data in the server 80. Accordingly, normative data corresponding to the usage conditions can be used in a plurality of control devices, as will be described below.

Figure 13B:
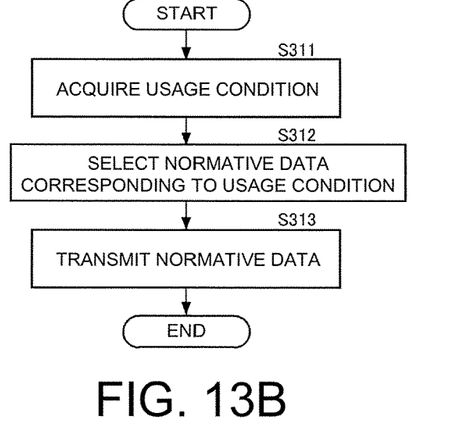
FIG. 13B is a flowchart illustrating a normative data transmitting process in the server.

(Selection and transmission of normative data corresponding to usage condition) FIG. 13B is a flowchart illustrating a process of transmitting normative data in the server.

As illustrated in FIG. 13B, the control unit 81 of the server 80 acquires a usage condition from a control device which requires acquiring normative data among the control devices 102, 102 and 103 (S311). The control unit 81 selects normative data corresponding to the usage condition and reads the normative data from the normative data storage unit 82 (S312). The control unit 81 transmits the selected normative data to the control device which requires acquiring normative data (S313).

By performing this process, the control devices 101, 102 and 103 can perform control parameter optimization by using the normative data corresponding to the usage condition.

Figure 14:
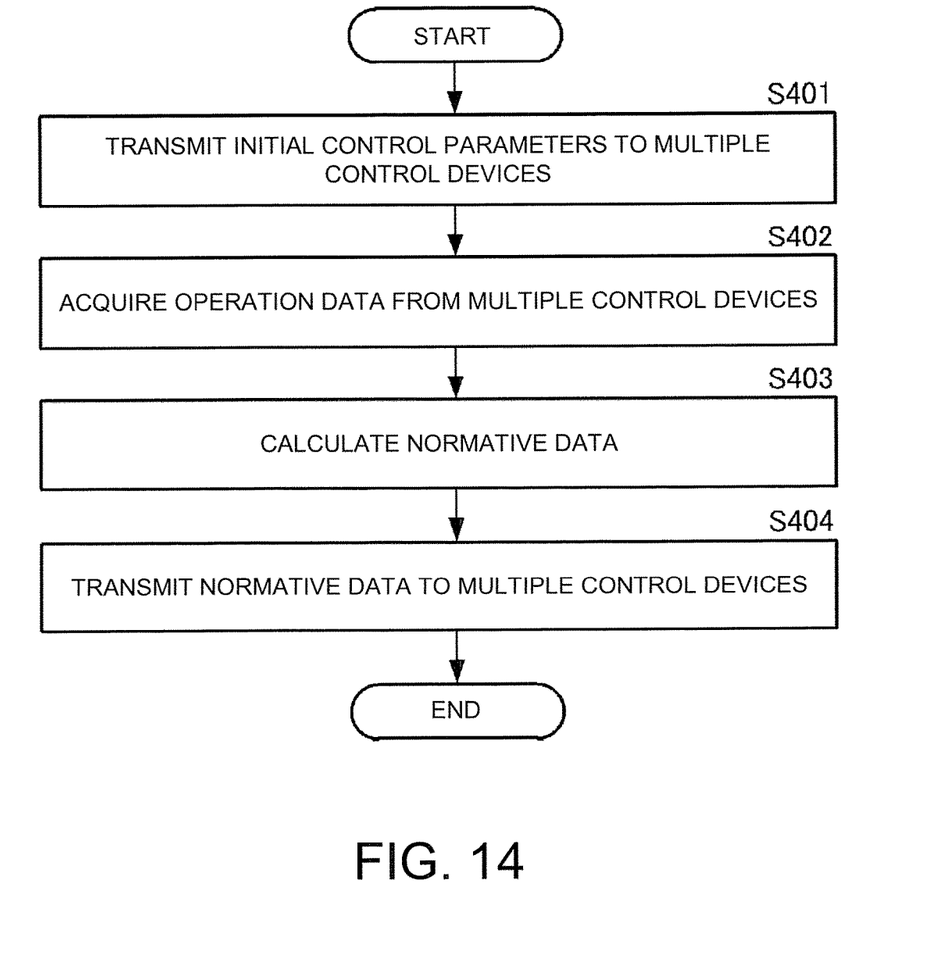
FIG. 14 is a flowchart illustrating a process of setting optimal normative data from operation data of a plurality of control devices and transmitting the optimal normative data to the plurality of control devices.

(Setting of optimal normative data from operation data of multiple control devices) FIG. 14 is a flowchart illustrating a process of setting optimal normative data from operation data of a plurality of control devices and transmitting the optimal normative data to the plurality of control devices.

As illustrated in FIG. 15, the control unit 81 of the server 80 transmits an initial control parameter to the multiple control devices 101, 102 and 103 (S401). The control unit 81 acquires operation data obtained on the basis of the initial control parameter from the multiple control devices 101, 102 and 103 (S402). The control unit 81 calculates normative data by using the operation data acquired from the multiple control devices 101, 102 and 103 (S403). Specifically, the control unit 81 calculates the average of multiple pieces of operation data, and calculates normative data from the average. The control unit 81 transmits the normative data to the multiple control devices 101, 102 and 103 (S404).

By performing this process, normative data having a small difference in control performance can be set between the multiple control devices 101, 102 and 103. In addition, the multiple control devices 101, 102 and 103 set control parameters by using the normative data, and thus a difference in control performance between the control devices 101, 102 and 103 can be minimized.

What is claimed is:

1. A control device comprising:
   an operation data acquisition unit which acquires operation data including a speed or a torque of a servo motor;
   a data evaluation unit which calculates an evaluation value by using normative data corresponding to an target of the operation data and the operation data; and
   a parameter determination unit which determines a control parameter applied to a servo driver for controlling an operation of the servo motor by using the evaluation value,
   wherein the data evaluation unit performs discrete sampling on the operation data and the normative data on a time axis, and calculates the evaluation value by using a difference between the operation data and the normative data at each time of the discrete sampling.

2. The control device according to claim 1, wherein an allowable value for the evaluation value is set,
   wherein the parameter determination unit changes the control parameter when the evaluation value is out of a range of the allowable value.

3. The control device according to claim 2, wherein the parameter determination unit maintains the control parameter when the evaluation value is within the range of the allowable value.

4. The control device according to claim 3, wherein the data evaluation unit performs discrete sampling on the operation data and the normative data on a time axis and calculates the evaluation value by using a difference between the operation data and the normative data at each time of the discrete sampling.

5. The control device according to claim 3, comprising:
   a display unit which displays an evaluation image based on the operation data and the control parameter.

6. The control device according to claim 3, wherein the normative data is set for each usage condition.

7. The control device according to claim 2, comprising:
a display unit which displays an evaluation image based on the operation data and the control parameter.

8. The control device according to claim 2, wherein the normative data is set for each usage condition.

9. The control device according to claim 1, comprising:
a display unit which displays an evaluation image based on the operation data and the control parameter.

10. The control device according to claim 9, wherein the normative data is set for each usage condition.

11. The control device according to claim 1, comprising:
a display unit which displays an evaluation image based on the operation data and the control parameter.

12. The control device according to claim 1, wherein the normative data is set for each usage condition.

13. The control device according to claim 1, wherein the normative data is set for each usage condition.

14. The control device according to claim 1, wherein the operation data includes vibration data.

15. A control method comprising:
acquiring operation data including a speed or a torque of a servo motor;
calculating an evaluation value by using normative data corresponding to an target of the operation data and the operation data; and
determining a control parameter applied to a servo driver for controlling an operation of the servo motor by using the evaluation value; and performing discrete sampling on the operation data and the normative data on a time axis, and calculating the evaluation value by using a difference between the operation data and the normative data at each time of the discrete sampling.

16. A control program which causes an information processing device to execute:
a process of acquiring operation data including a speed or a torque of a servo motor;
a process of calculating an evaluation value by using normative data corresponding to an target of the operation data and the operation data;
a process of determining a control parameter applied to a servo driver for controlling an operation of the servo motor by using the evaluation value; and
a process of performing discrete sampling on the operation data and the normative data on a time axis, and calculating the evaluation value by using a difference between the operation data and the normative data at each time of the discrete sampling.

17. A control device comprising:
an operation data acquisition unit which acquires operation data including a speed or a torque of a servo motor;
a data evaluation unit which calculates an evaluation value by using normative data corresponding to a target of the operation data and the operation data; and
a parameter determination unit which determines a control parameter applied to a servo driver for controlling an operation of the servo motor by using the evaluation value,
wherein an allowable value for the evaluation value is set, the parameter determination unit changes the control parameter when the evaluation value is out of a range of the allowable value,
wherein the data evaluation unit performs discrete sampling on the operation data and the normative data on a time axis and calculates the evaluation value by using a difference between the operation data and the normative data at each time of the discrete sampling.

* * * * *